United States Patent
Golliver

(10) Patent No.: US 9,513,976 B2
(45) Date of Patent: Dec. 6, 2016

(54) PROVIDING EXTENDED MEMORY SEMANTICS WITH ATOMIC MEMORY OPERATIONS

(75) Inventor: Roger Golliver, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 13/997,534

(22) PCT Filed: Dec. 30, 2011

(86) PCT No.: PCT/US2011/068149
§ 371 (c)(1),
(2), (4) Date: Jun. 24, 2013

(87) PCT Pub. No.: WO2013/101199
PCT Pub. Date: Jul. 4, 2013

(65) Prior Publication Data
US 2014/0052943 A1   Feb. 20, 2014

(51) Int. Cl.
*G06F 9/52*   (2006.01)
*G06F 9/45*   (2006.01)

(52) U.S. Cl.
CPC ............... *G06F 9/526* (2013.01); *G06F 8/458* (2013.01)

(58) Field of Classification Search
None
See application file for complete search history.

(56) References Cited

U.S. PATENT DOCUMENTS

| 5,317,734 | A | * | 5/1994 | Gupta ........................ 717/161 |
| 5,535,365 | A | * | 7/1996 | Barriuso ................. G06F 9/526 710/200 |
| 7,185,150 | B1 | * | 2/2007 | Kogge ........................ 711/147 |
| 2007/0198785 | A1 | * | 8/2007 | Kogge et al. ................. 711/154 |
| 2007/0255896 | A1 | | 11/2007 | Mangione-Smith |
| 2010/0332808 | A1 | | 12/2010 | Adl-Tabatabai et al. |

OTHER PUBLICATIONS

Wheeler et al. "Qthreads: An API for Programming with Millions of Lightweight Threads." Apr. 2008. IEEE. IPDPS 2008.*
qthread.h. Jul. 2010. https://qthreads.googlecode.com/files/qthread-1.4.tar.bz2.*
qthread.c. Jul. 2010. https://qthreads.googlecode.com/files/qthread-1.4.tar.bz2.*
qt_atomics.h. Jul. 2010. https://qthreads.googlecode.com/files/qthread-1.4.tar.bz2.*
pthread_spin_lock.c. Oct. 2009. http://sourceware.org/git/?p=glibc.git;a=commit;h=7f9cd6ed20b12435e68153870cee5adbe09c4bca.*
Farber et al. "Experimental Comparison of Emulated Lock-free vs. Fine-grain Locked Data Structures on the Cray XMT." Apr. 2010. IEEE. IPDPSW 2010.*
Benjamin J. Ahrens. "Exploring Alternatives to Hardware Support for Fine-grain Synchronization." Dec. 2012. https://www.ideals.illinois.edu/bitstream/handle/2142/42154/Benjamin_Ahrens.pdf?sequence=1.*
Maurice Herlihy. "A Methodology for Implementing Highly Concurrent Data Structures." Mar. 1990. ACM. ACM SIGPLAN Notices. vol. 25. pp. 197-206.*
rasta_freak. "Atomic integers & memcpy( )." Aug. 2008. http://cboard.cprogramming.com/c-programming/105926-atomic-integers-memcpy.html.*
International Search Report and Written Opinion dated Jun. 22, 2012 in International Application No. PCT/US2011/068149, filed Dec. 30, 2011.

\* cited by examiner

*Primary Examiner* — Nathan Sadler
(74) *Attorney, Agent, or Firm* — Andrews Kurth Kenyon LLP

(57) ABSTRACT

A computer-implemented method and a corresponding computer system for emulation of Extended Memory Semantics (EMS) operations. The method and system include obtaining a set of computer instructions that include an EMS operation, converting the EMS operation into a corresponding atomic memory operation (AMO), and executing the AMO on at least one processor of a computer.

24 Claims, 6 Drawing Sheets

PROVIDING EXTENDED MEMORY SEMANTICS WITH ATOMIC MEMORY OPERATIONS

GOVERNMENT RIGHTS

This invention was made with government support under agreement number H98230-08-0011. The government has certain rights in the invention.

BACKGROUND INFORMATION

Multi-threaded computer architectures such as those of the Tera MTA and Cray XMT computers provide for large-scale parallel execution of threads in order to hide memory latency and make efficient use of available bandwidth by running other threads when data is locked during thread execution. The Tera MTA and Cray XMT architectures include a programming and execution model that uses a feature known as extended memory semantics (EMS), which includes operations that rely on the use of a full/empty memory tag bit in order to combine reading/writing of data with synchronization.

The full/empty bit feature involves associating a hidden bit with each memory location (e.g., a word) to indicate whether the memory location is in a "full" or "empty" state, thereby facilitating data locking and synchronization. Full/empty bits require non-standard/non-commodity memory components. However, Full/empty bits are sometimes used because they require a relatively low memory footprint for locking/synchronization. For example, a writeEF operation will stall (commonly known as "spinning") until the bit is empty (e.g., equal to zero), then set the bit to full (e.g., equal to one) after the write is complete. A readFE operation will stall until the bit is full, then set the bit to empty after the read is complete. Thus, only a single operation is required to (i) acquire a lock and read data (e.g., readFE) or (ii) release a lock and write data (e.g., writeEF). In contrast, having an explicit lock operation would increase memory requirements because an additional lock variable would be required, and also reduce bandwidth.

The x86 programming model does not include EMS or full/empty bits in the memory. Without the use of these additional bits (which are not present in standard memory modules), programmers often rely on either an explicit lock or a single bit that is reserved in the user-visible portion of the data. Explicit locks consume additional memory and/or bandwidth, whereas reserving a bit in user-visible memory can be difficult to accomplish for certain data types such as floating-point data.

x86 based computer systems may include a limited set of atomic memory operations (AMOs) for synchronization. Atomic operations are operations that can be performed without interference from any other operations while the operation is in progress. These AMOs include Fetch-and-Add, Compare-and-Swap, and Test-and-Set.

DETAILED DESCRIPTION OF EXAMPLE EMBODIMENTS

Figure 1:
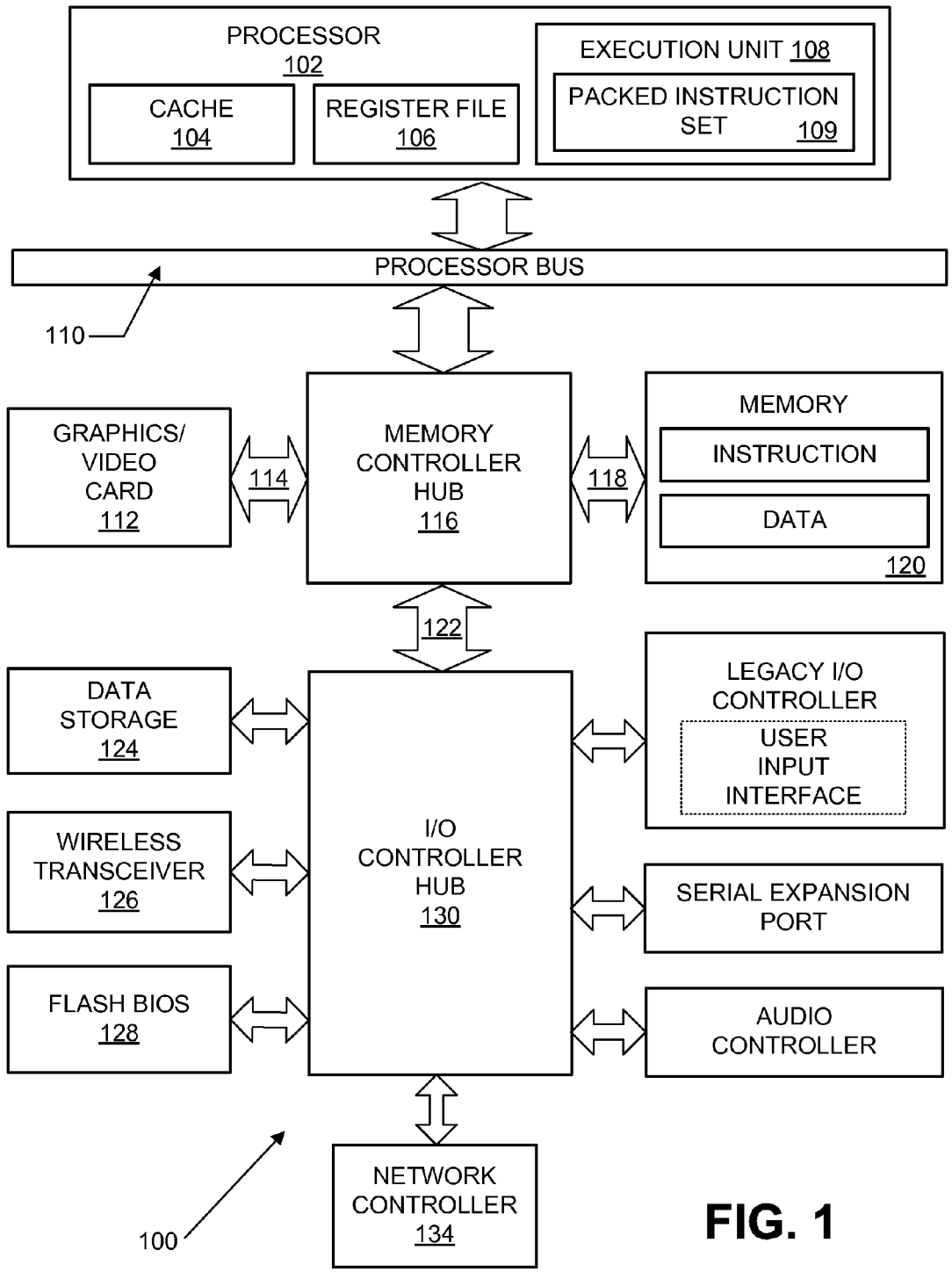
FIG. 1 is a block diagram of a system for emulating EMS operations according to an example embodiment of the present invention.

The following description describes systems and methods to emulate and execute, without using full/empty bits in memory, the EMS style of programmed instructions, which was previously developed on the Tera MTA and Cray XMT computers. Thus, the example embodiments provide EMS on systems that do not currently support EMS. Additionally, the code sequences are short enough to be inlined by default, rather than accessed by a function call. The example embodiments may be provided entirely in software, obviating a need to perform hardware modifications of systems in which the example embodiments may be implemented. However, the example embodiments may be modified to include hardware or combination hardware/software implementations.

Instead of using a full bit to indicate the "full" or "empty" states, a single canonical data value may be used to indicate "empty" while all other values indicate "full". This canonical value may be any unused data value. For example, for floating-point data, the value may be any not-a-number (NaN), e.g., a signaling NaN (sNaN), which raises an invalid exception when accessed. For pointers, the value may be all bits equal to one (all-bits-one) or an integer indefinite value (e.g., one followed by all zeroes, which represents a maximum negative value). Integer indefinite values are typically used to indicate an out-of-range result and may also be used for signed integers, ASCII Strings and Unicode (e.g., UTF-8) data types.

For unsigned integers, each unsigned integer may be restricted to a range of values as a condition for using the empty value, e.g., a range from IntegerIndefinite to MaxUnsignedInt. This requirement is because unlike signed integers and floating point data types, there is rarely ever a single value that is unused in practice. By restricting the range of available values, it is guaranteed that the unsigned integer will never be unintentionally set to the empty value. One example for an unsigned 32-bit integer would be to use 0x80000000 as the empty value, and 0x80000000 thru 0xFFFFFFFF as the reserved range. This example would restrict the unsigned 32-bit integer to $2^31$-bits of data. It should be noted that there may be case-specific exceptions to the requirement that unsigned integers be restricted to a value range. For example, when it is known that a particular application will never write a certain value to an unsigned integer, any unsigned integer used in that application need not be restricted because there exists an identified unused value for use as the empty value.

Example embodiments provide for the emulation of EMS, including Full/empty bit semantics, using code sequences in which a read/write with state change is performed as a single AMO.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs.

For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

In one embodiment, destination and source registers/data are generic terms to represent the source and destination of the corresponding data or operation. In some embodiments, they may be implemented by registers, memory, or other storage areas. In one embodiment, a source registers may also act as a destination register by, for example, writing back the result of an operation performed on the data obtained from the source register.

FIG. 1 is a block diagram of a computer system 100 formed with a processor 102 that includes one or more execution units 108 to perform at least one EMS operation in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In an alternative embodiment, the bus 110 may be replaced with a linked based inter-processor communication architecture such as HyperTransport, Intel's Quick Path Interconnect®, or InfiniBand.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102. The memory 120 may include a software operating system (OS) that executes one or more software programs, each of which involve issuing program instructions in the form of processes and threads within those processes. Each thread may include one or more AMOs. The software programs may include a software compiler that obtains instructions written in a high level programming language and converts those instructions into machine code for execution one the processor 102. To generate the machine code, the compiler may reference a software library stored in the memory 120. The software library may include one or more library files, at least one of which includes an emulated EMS operation that includes instructions for performing an EMS operation using AMOs.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
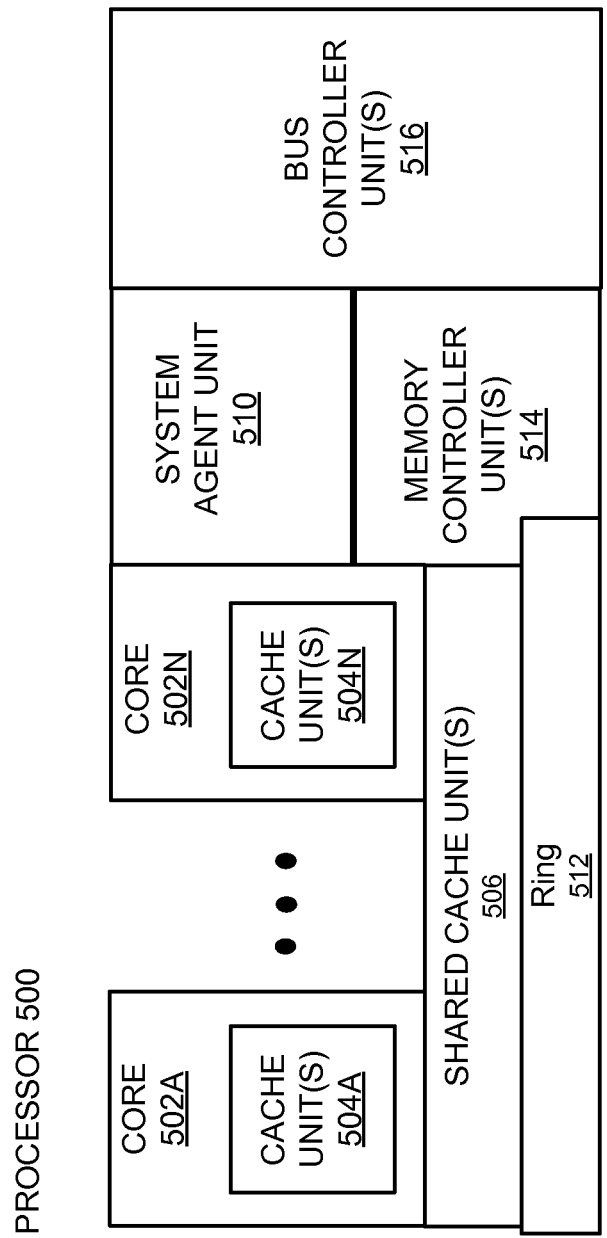
FIG. 2 is a block diagram of a processor configured to emulate EMS operations according to an example embodiment of the present invention.

FIG. 2 is a block diagram of a single core processor and a multicore processor 500 with integrated memory controller and graphics according to embodiments of the invention. The solid lined boxes in FIG. 2 illustrate a processor 500 with a single core 502A, a system agent 510, a set of one or more bus (or link) controller units 516, while the optional addition of the dashed lined boxes illustrates an alternative processor 500 with multiple cores 502A-N, and a set of one or more integrated memory controller unit(s) 514 in the system agent unit 510. The memory controller unit(s) 514 may manage memory accesses by each of the processors cores 502A-N, including loads and stores. The memory controller unit(s) 514 may be configured to enforce memory semantics, e.g., ensuring that AMOs remain atomic by locking data when the data is being operated on by an atomic operation.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the set of shared cache units 506 and the system agent unit 510, alternative embodiments may use any number of well-known techniques for interconnecting such units.

In some embodiments, one or more of the cores 502A-N are capable of multi-threading. For example, it should be understood that each core 502A-N may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 3:
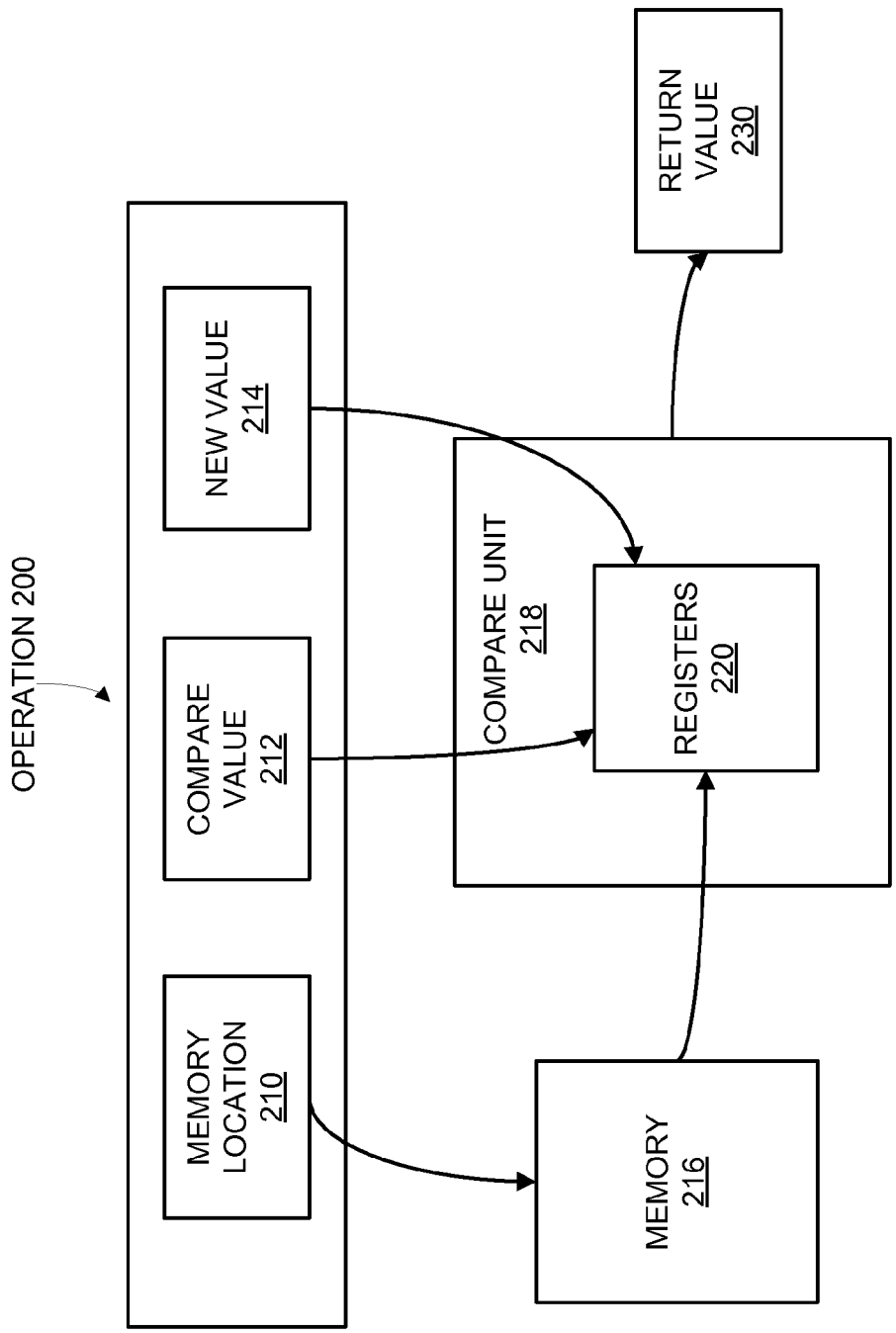
FIG. 3 is a block diagram illustrating the operation of a Compare-and-Swap or Contrast-and-Swap operation according to an example embodiment of the present invention.

FIG. 3 is a block diagram illustrating the operation of a Compare-and-Swap or Contrast-and-Swap operation according to an example embodiment of the present invention.

An operation 200 may be included as part of a function that emulates an EMS style operation written in a high level language such as Chapel (a programming language developed by Cray for providing access to EMS). The EMS operation may be a read or write instruction. In one embodiment, the operation 200 is a Compare-and-Swap operation which receives, as input parameters, a memory location 210, a compare value 212 and a new value 214. The memory location 210 may be pointer to a location in a storage location, e.g., a physical memory 216. The compare value 212 and the new value 214 may be placed in a temporary storage location such as one of a set of registers 220. The registers 220 may be included as part of a set of physical registers in a processor having a compare unit 218.

The compare unit 218 may be a processor execution unit that obtains a value from the memory 216 based on the memory location 210, loads the obtained value into a temporary storage location (e.g., a register) and compares the obtained value to the compare value 212. In a Compare-and-Swap operation, the content of a memory location is compared to a first value and if the value at the memory location is equal to the first value, the value at the memory location is changed to a second, new value. Therefore, if the comparison indicates that the values are equal, the memory location from which the value was obtained is overwritten with the new value 214 (i.e., the existing memory value is swapped with the new value 214). However, if the comparison fails (i.e., the values are not equal), the memory location retains its existing value. After performing the comparison, a return value 230 (e.g., the value obtained from the memory 216) may be issued.

According to the Contrast-and-Swap operation of embodiments of the present invention, the value at the memory location is only changed to the new value when the comparison fails, i.e., when the value at the memory location is different from the first value. A Contrast-and-Swap operation may similarly include the memory location 210, the compare value 212 and the new value 214. However the swapping is conditioned on the obtained value being different (not equal) to the compare value 212. If this is the case, then the memory location is overwritten with the new value 214. Thus, the Contrast-and-Swap operation is the conceptual opposite of the Compare-and-Swap.

As mentioned above, the x86 architecture already supports Compare-and-Swap operations. According to one embodiment of the present invention, support for Contrast-and-Swap may be added via software functions, so that the comparison between the obtained value and the compare value 212, as well as the subsequent swapping of memory values, are performed with the aid of these additional functions. According to the example embodiments below, the emulated EMS operations and the Contrast-and-Swap operation may be provided as functions in a high level language, e.g., the C code in the Code Appendix below.

In an alternative embodiment, EMS operations may be supported in hardware or a combination of hardware and software. For example, it may be possible to extend the x86 architecture to provide hardware support for the Contrast-and-Swap operation.

EMS includes eight basic operations: readFE, readFF, readXX, writeEF, writeFF, writeXF, reset, and is Full. The example embodiments of the present invention provide for AMO based emulation of all eight operations.

The following code provides for EMS emulation in accordance with an example embodiment of the present invention:

```
Y = readFE(x) - Wait until mem is full and leave empty
  -while( ( y =_sync_val_exchange( x, empty ) ) == empty );
  /* aka _sync_lock_test_and_set( x, empty ) */
Y = readFF(x) - Wait until mem is full and leave full
  -while( ( y = *x) == empty );
Y = readXX(x) - Read data in mem without regard to state of full/empty
bit
and without changing state
  -y = *x;
writeEF(x,y) - Wait until mem is empty, overwrite and leave full
  -assert( y != empty ); while ( !_sync_bool_compare_and_swap( x,
    empty, y) );
writeFF(x,y) - Wait until mem is full, overwrite and leave full
  -assert( y != empty ); while( !_sync_bool_contrast_and_swap( x, empty,
    y ) ) ;
writeXF(x,y) - Update mem without regard to state of full/empty bits and
leave full
  -assert( y != empty ) ; *x = y;
reset(x) - Set state of EMS bit to empty
  -*x = empty;
isFull(x) - return true if full
  -(x != empty)
```

In the code above, writeEF is implemented using Compare-and-Swap, whereas writeFF is implemented using Contrast-and-Swap for efficiency reasons. Example embodiments of the present invention relate to providing EMS emulation in systems that use a shared memory model as well as systems that use a distributed memory model. The fetch penalty associated with Compare-and-Swap is especially significant in distributed memory systems, where the data may be fetched from a remote node and the Compare-and-Swap performed remotely, rather than locally as with a shared memory model (e.g., via a local cached AMO). Remote fetching and execution may incur significant performance penalties (e.g., latency and bandwidth). The Contrast-and-Swap operation provides for improved performance by eliminating the requirement of an initial fetch.

In one embodiment, the writeFF operation is emulated with the aid of the Contrast-and-Swap operation, which enables the writeFF operation to be performed with one long latency operation, whereas implementing writeFF without Contrast-and-Swap would require an additional read of the memory location in order to conform to the requirements of Compare-and-Swap. Because the Compare-and-Swap operation only swaps when the memory value is equal to the first value, swapping to the new value when the memory location is "full" (e.g., writeFF) requires the memory value to be read out and then passed back into the Compare-and-Swap operation. That is, the memory value must be identified beforehand (incurring a fetch penalty) in order to perform a successful comparison. In contrast, with a Contrast-and-Swap operation, the memory value need not be passed back into the operation if the memory value is compared to an empty value. Thus, Contrast-and-Swap avoids an additional memory read when the swapping condition is the memory being full. On the other hand, when the swapping condition is the memory being empty (e.g., writeEF), the Compare-and-Swap operation is sufficient to perform the swap without an additional memory read, since the memory value can be compared directly to the empty value and swapped if equal to empty. Accordingly, one aspect an embodiment of the present invention relates to the efficient emulation of EMS using a mix of Compare-and-Swap and Contrast-and-Swap to achieve optimal performance, e.g., using as few memory accesses as possible.

For illustration purposes, readFE is implemented above using Test-and-Set. However, readFE may alternatively be implemented using Compare-and-Swap or Contrast-and-Swap. In this instance, the cached performance is essentially the same regardless of whether Compare-and-Swap, Contrast-and-Swap or Test-and-Set is used. However, for non-cached situations, Contrast-and-Swap would be more efficient, for the reasons described above, i.e., because the Contrast-and-Swap implementation enables the AMO to have all the information it needs to determine whether the readFE semantics were achieved, without having to do an additional memory fetch to obtain additional information.

Because there are performance differences depending on whether AMOs are being executed in a cached or non-cached setting, it may be desirable to provide emulated operations that are specific to each setting. The following is an example embodiment of source code for cached AMO versions of emulated readFE and writeFF operations, suitable for use with systems in which the AMO is performed in cache:

```
1   /* readFE -- wait until full, leave empty, return value */
2   static _inline int64_t
3   readFE_I8(sync_int64_t *mem_loc) {
4       int64_t ret_val;
5       _builtin_prefetch((void *)mem_loc,1,3);
6       while(1) {
7           while( pause((void *)mem_loc) ) /* okay to pause first -- waiting
for prefetch */
8               if( TAKEN(empty_val != (ret_val = *mem_loc)) ) break;
9           ret_val = _sync_lock_test_and_set( mem_loc, empty_val); /*
atomic exchange */
10          if ( TAKEN( empty_val != ret_val ) ) break;
11          /* if exchange is empty for empty */
12      }   /* then wait until full again */
13      return ret_val;
14  }
15  /* writeFF -- wait until full, leave full, set value */
16  static _inline void
17  writeFF_I8(sync_int64_t *mem_loc, int64_t mem_val) {
18      assert(empty_val_I8 != mem_val);
19      _builtin_prefetch((void *)mem_loc,1,3);
20      while( 1 ) {
21          while( pause((void *)mem_loc) ) /* okay to pause first -- waiting
for prefetch */
22              if( TAKEN(empty_val != (tmp_val = *mem_loc)) ) break;
23              if( TAKEN(_sync_bool_compare_and_swap( mem_loc, tmp_val,
mem_val) ) )
24              break;
25          /* if compare-and-swap is not successful */
26      }   /* then wait until empty again */
27      return;
28  }
```

In a cached AMO, a prefetch may be performed to quickly access the data. The writeFF operation above uses a Compare-and-Swap operation. The writeFF implementation includes an assert statement (line 18), then a while loop (line 20). An optional while pause loop (line 21) releases the processor to take on other threads while the data is being prefetched. Alternatively, the while loop at line 21 may be deleted to form a straight spin loop (e.g., while (1)). Also included is a call to a built-in prefetch function (line 19), where "1, 3" indicates to the compiler that the cache line will be modified. An if statement (line 22) performs a spin until the value at the memory location is not empty. A second if statement (line 23) performs the writing. In a non-cached setting, the while loop that includes the if statement in line 22 could be optimized with a while loop based on Contrast-and-Swap instead of using Compare-and-Swap, e.g., as shown in the previous writeFF implementation above.

The following is an example embodiment of source code for non-cached AMO versions of emulated readFE and writeFF operations, suitable for use with non-cached systems, where the AMOs are performed where the data resides rather than in a cache. Prefetch may not be required as with the cached version, since the AMO can be performed in a memory controller or over the inter-processor fabric in a computing cluster:

```
1       /* readFE -- wait until full, leave empty, return value */
2       static _inline int64_t
3       readFE_I8(sync_int64_t *mem_loc) {
4           int64_t ret_val;
5           while( 1 ) { /* while empty spin until full */
6               ret_val = _sync_lock_test_and_set( mem_loc, empty_val); /* atomic exchange */
7               if ( TAKEN( empty_val != ret_val ) )
8                   break;
9               else /* if exchange is empty for empty then wait until full */
10                  pause((void *)mem_loc);
11          }
12          return ret_val;
13      }
14      /* writeFF -- wait until full, leave full, set value */
15      static _inline void
16      writeFF_I8(sync_int64_t *mem_loc, int64_t mem_val) {
17          assert(empty_val_I8 != mem_val);
18          while( 1 ) { /* while empty spin until full */
19              if( TAKEN( _sync_bool_contrast_and_swap( mem_loc, empty_val, mem_val) ) )
20                  break;
21              else /* if contrast_and_swap is not successful then wait until full again */
22                  pause((void *)mem_loc);
23          }
24          return;
25      }
```

Figure 4:
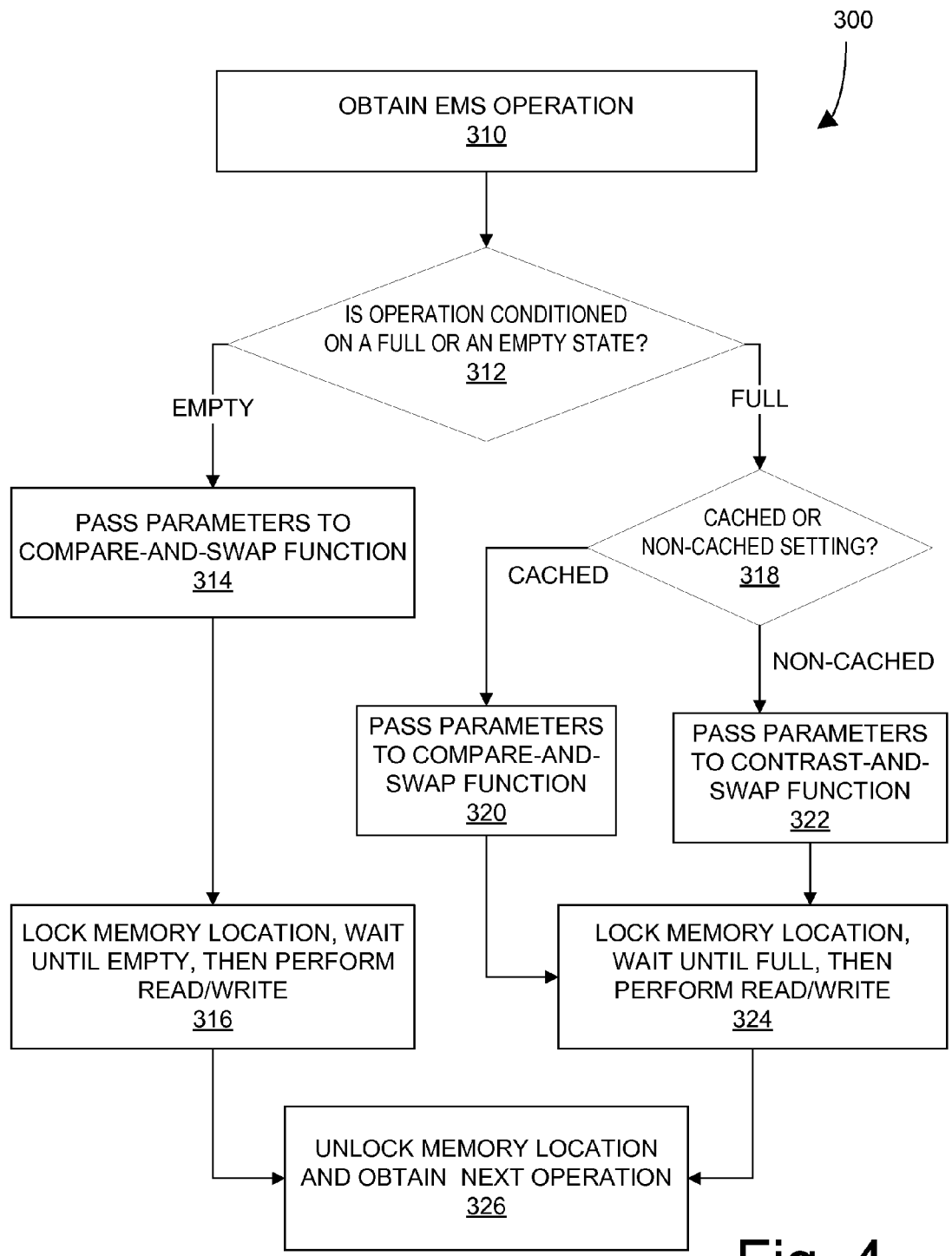
FIG. 4 is a flow chart of a method for providing EMS emulation according to an example embodiment of the present invention.

FIG. 4 is a flow chart of a method 300 for providing EMS emulation according to an example embodiment of the present invention. The method 300 reflects the optimizations discussed in connection with the code implementations above.

At 310, an EMS operation is obtained, e.g., from code written in a high level programming language.

At 312, it is determined whether the operation is conditioned on a full or an empty state. For example, readFE is conditioned on a full state, whereas readEF is conditioned on an empty state.

At 314, the operation is conditioned on an empty state and the data parameters for the operation are passed to a Compare-and-Swap function.

At 316, the memory location associated with the operation is locked by the Compare-and-Swap operation, which may be repeated until the comparison indicates that the empty state is reached, at which point a read or write may be performed based on the operation's parameters.

At 318, the operation is conditioned on a full state and it is determined whether the current operating environment is a cached or a non-cached setting. If the environment is a cached setting, then the parameters are passed to a Compare-and-Swap function (320).

However, if the environment is non-cached, the parameters are passed to a Contrast-and-Swap function (322).

At 324, the memory location associated with the operation is locked by the Contrast-and-Swap operation or Compare-and-Swap operation, which may be repeated until the comparison indicates that the full state is reached, at which point a read or write may be performed based on the operation's parameters.

At 326, the memory location is unlocked and the method 300 proceeds to obtain the next operation.

Figure 5:
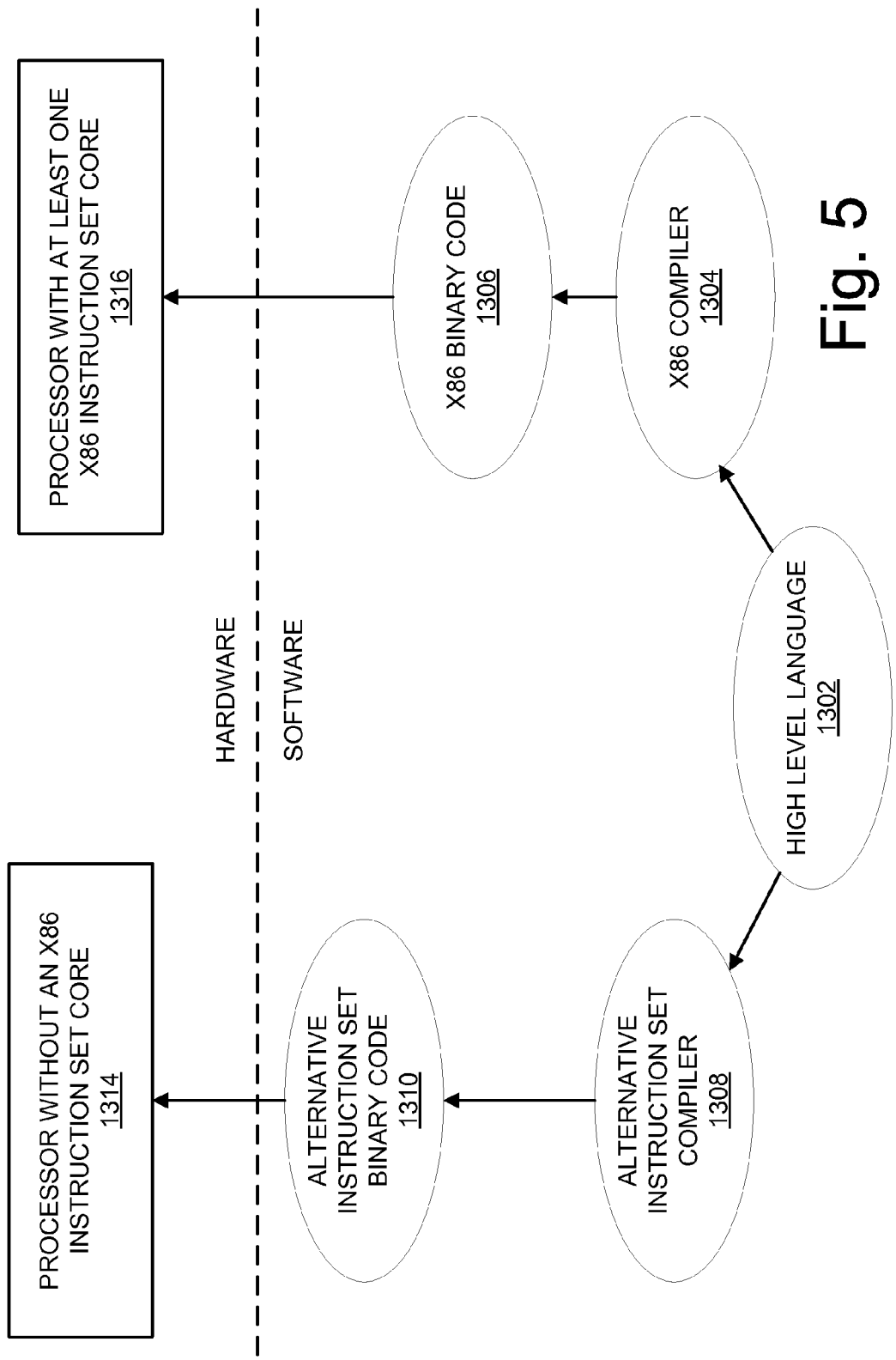
FIG. 5 is a block diagram of a system for converting EMS operations into machine code executable by a processor with at least one x86 instruction set core according to an example embodiment of the present invention.

FIG. 5 is a block diagram of a system for converting EMS operations into machine code executable by a processor with at least one x86 instruction set core according to an example embodiment of the present invention. FIG. 5 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel® processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 5 shows the program in the high level language 1302 may be compiled using an alternative instruction set compiler 1308 (e.g., an EMS compiler) to generate alternative instruction set binary code 1310 (e.g., EMS binary code) that may be natively executed by a processor without at least one x86 instruction set core 1314 (e.g., a processor with cores that execute the EMS instruction set). The x86 compiler 1304 may convert EMS operations provided in the high level language 1302 into the x86 binary code 1306, which is made up of instructions from the x86 instruction set (e.g., native instructions such as Compare-and-Swap, as well as instructions that are combined to implement Contrast-and-Swap). Thus, the x86 compiler 1304 represents software that, through emulation, simulation or any other process, allows a processor or other electronic device that has an x86 instruction set processor or core to execute the EMS operations provided in the high level language 1302.

Figure 6:
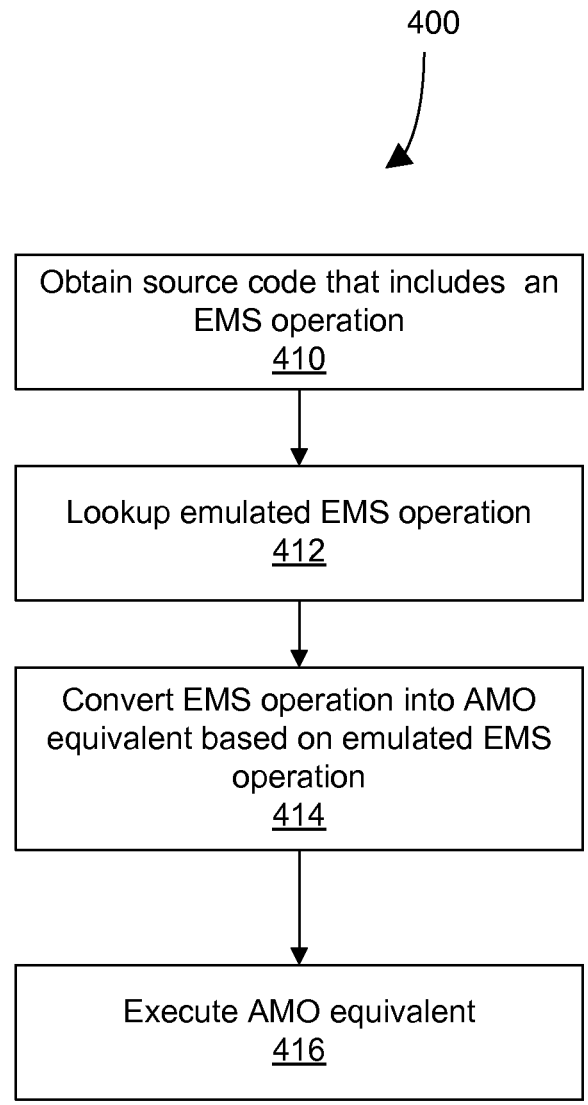
FIG. 6 is a flow chart of a method for converting EMS operations into machine code executable by a processor with at least one x86 instruction set core according to an example embodiment of the present invention.

FIG. 6 is a flow chart of a method 400 for converting EMS operations into machine code executable by a processor with at least one x86 instruction set core according to an example embodiment of the present invention. The method 400 may be implemented on any multi-threaded computer system that supports AMOs, e.g., the system of FIG. 1.

At 410, source code that includes an EMS operation is obtained, e.g., by the x86 compiler 1304 in FIG. 5. The source code may be part of a software program that uses multi-threading to perform data processing, for example a graphics benchmark program such as SCCA.

At 412, at least one emulated EMS operation is looked up. The emulated EMS operation may be included in a software library, e.g., a header file that includes the code in the Code Appendix below.

At 414, the EMS operation may be converted into an equivalent AMO operation by referencing the emulated EMS operation. Based on the input parameters of the EMS operation, a set of machine code instructions that correspond to the AMO operation may be output. The machine code may further include instructions to initialize the relevant memory locations (e.g., a range of memory locations required by the software program) to the empty value(s) required by the data type used in the AMO operation. The initialization may be provided explicitly in the source code, or in the software library.

At 416, the AMO operation is executed on at least one processor of the system, e.g., on at least one core of a multi-core processor or on a plurality of processors in a computing cluster.

The following Code Appendix includes various functions for emulating EMS operations. Different versions of these emulated functions are provided for 4-byte and 8-byte integers (both signed and unsigned), floating point values and double precision floating point values. Cached as well as non-cached versions are also provided. The code begins with the defining of canonical empty values using hexadecimal constants (e.g., a SNaN and Max Negative Integer). The Contrast-and-Swap functions are then defined before proceeding to the emulated EMS operations. Two versions of the Contrast-and-Swap functions are provided, indicated by a prefix of "sync_bool" or "sync_val". The sync_bool version is a Boolean true/false comparison, whereas the sync_val version returns the value in memory in case the value is needed for subsequent processing before the next comparison. Sync_bool and sync_val versions of Compare-and-Swap are already provided as built-in functions in many compilers, including the Intel® compiler and the GNU GCC based compilers.

The code also includes optional compiler optimizations, including a "Taken" macro that references a built-in function ("builtin_expect"), to hint to the compiler whether or not a branch is expected to be taken. In this instance, the expectation is whether a Compare-and-Swap or Contrast-and-Swap will be successful. Since the code has been optimized for low contention situations, the expectation is that the comparison will be successful (i.e., the branch is expected to be taken). This optimizes the machine code generated by the compiler.

The code in this appendix should be taken as exemplary and may be modified to suit the characteristics of the system on which the code is executed. For example, the use of Contrast-and-Swap has been limited to non-cached versions, since (as explained above) the advantages of Contrast-and-Swap are especially significant in a non-cached situation. However, Contrast-and-Swap may also be used in cached versions, and the code may be modified accordingly.

The example embodiments of the present invention may be implemented as software algorithms stored on a computer readable medium. In one embodiment, the algorithms may be integrated into test systems and design/debug tools used for making computer processors. In another embodiment, the algorithms may be used as optimized reference code for graph benchmarks such as SSCA2 and graph500. The software code for these two benchmarks were successfully modified to utilize the emulated operations of the present invention, and experimental results using the modified benchmarks on a Xeon™ based computer system indicated a substantial performance improvement in solving graph problems. The example embodiments of the present invention may especially be suited for programs in which there is a relatively low amount of contention for synchronization operations (e.g., graph programs), since low contention means a successful Compare-and-Swap or Contrast-and-Swap will often occur on the first try.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate, morph, emulate, or otherwise convert an instruction (e.g., an EMS operation) to one or more other instructions to be processed by the core. The instruction converter may be implemented in software, hardware, firmware, or a combination thereof. The instruction converter may be on processor, off processor, or part on and part off processor.

Thus, techniques for emulating EMO operations according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

CODE APPENDIX

```
/* Routines to emulate EMS's full/empty bit operations with "lock cmpxchng:
 * and EMS's atomic fetch and add with "lock xadd" */ include <stdint.h>
include <assert.h> ifndef EMS_ON_X86_64_H
define EMS_ON_X86_64_H typedef volatile int32_t sync_int32_t;
typedef volatile int64_t sync_int64_t;

typedef volatile int32_t sync_uint31_t;
typedef volatile int64_t sync_uint63_t;

typedef volatile float   sync_float32_t;
typedef volatile double  sync_float64_t;

#define TAKEN(bool) __builtin_expect((bool),1)

static __inline int
pause(void *mem_loc)
{ __asm__ __volatile__ ("pause"); return 1; } static const int32_t empty_val_I4 = (int32_t)      0x80000000UL;       /* Max Neg Int */
static const int32_t empty_val_U4 = (int32_t)      0x80000000UL;       /* Max Neg Int */
static const int32_t empty_val_F4 = (int32_t)      0xFF800001UL;       /* Signaling NaN */
static const int64_t empty_val_I8 = (int64_t)0x8000000000000000ULL;    /* Max Neg Int */
static const int64_t empty_val_U8 = (int64_t)0x8000000000000000ULL;    /* Max Neg Int */
static const int64_t empty_val_F8 = (int64_t)0xFFF0000000000001ULL;    /* Signaling Nan */

/*
 * full empty bits operations:
 * readFE, readFF, readXX, writeEF, writeFF, writeXF, reset and isFull
 */ ifndef RAG_CACHED_AMO
static __inline int __sync_bool_contrast_and_swap_I4(sync_int32_t *mem_loc,
sync_int32_t not_val, sync_int32_t new_val) {
    sync_int32_t ret_val;
    if ( TAKEN(not_val != (ret_val = *mem_loc)) )
            return __sync_bool_compare_and_swap(mem_loc,ret_val,new_val);
    return 0;
} static __inline sync_int32_t __sync_val_contrast_and_swap_I4(sync_int32_t
*mem_loc, sync_int32_t not_val, sync_int32_t new_val) {
    sync_int32_t ret_val;
    if ( TAKEN(not_val != (ret_val = *mem_loc)) )
            /* if compare-swap is successful then return what was in memory */
            if( TAKEN(__sync_val_compare_and_swap(mem_loc,ret_val,new_val) ==
ret_val) )
```

```
61              return ret_val;
62          /* if contrast_and_swap was not successful then return not_val */
63          return not_val;
64      }
65
66      static __inline int __sync_bool_contrast_and_swap_I8(sync_int64_t *mem_loc,
67      sync_int64_t not_val, sync_int64_t new_val) {
68          sync_int64_t ret_val;
69          if ( TAKEN(not_val != (ret_val = *mem_loc)) )
70              return __sync_bool_compare_and_swap(mem_loc,ret_val,new_val);
71          return 0;
72      }
73
74      static __inline sync_int64_t __sync_val_contrast_and_swap_I8(sync_int64_t
75      *mem_loc, sync_int64_t not_val, sync_int64_t new_val) {
76          sync_int64_t ret_val;
77          if ( TAKEN(not_val != (ret_val = *mem_loc)) )
78              /* if compare-swap is successful then return what was in memory
79      */
80              if( TAKEN(__sync_val_compare_and_swap(mem_loc,ret_val,new_val) ==
81      ret_val) )
82                  return ret_val;
83          /* if contrast_and_swap was not successful then return not_val */
84          return not_val;
85      }
86
87      static __inline int __sync_bool_contrast_and_swap_U4(sync_uint31_t *mem_loc,
88      sync_uint31_t not_val, sync_uint31_t new_val) {
89          sync_uint31_t ret_val;
90          if ( TAKEN(not_val != (ret_val = *mem_loc)) )
91              return __sync_bool_compare_and_swap(mem_loc,ret_val,new_val);
92          return 0;
93      }
94
95      static __inline sync_uint31_t __sync_val_contrast_and_swap_U4(sync_uint31_t
96      *mem_loc, sync_uint31_t not_val, sync_uint31_t new_val) {
97          sync_uint31_t ret_val;
98          if ( TAKEN(not_val != (ret_val = *mem_loc)) )
99              /* if compare-swap is successful then return what was in memory
100     */
101             if( TAKEN(__sync_val_compare_and_swap(mem_loc,ret_val,new_val) ==
102     ret_val) )
103                 return ret_val;
104         /* if contrast_and_swap was not successful then return not_val */
105         return not_val;
106     }
107
108     static __inline int __sync_bool_contrast_and_swap_U8(sync_uint63_t *mem_loc,
109     sync_uint63_t not_val, sync_uint63_t new_val) {
110         sync_uint63_t ret_val;
111         if ( TAKEN(not_val != (ret_val = *mem_loc)) )
112             return __sync_bool_compare_and_swap(mem_loc,ret_val,new_val);
113         return 0;
114     }
115
116     static __inline sync_uint63_t __sync_val_contrast_and_swap_U8(sync_uint63_t
117     *mem_loc, sync_uint63_t not_val, sync_uint63_t new_val) {
118         sync_uint63_t ret_val;
119         if ( TAKEN(not_val != (ret_val = *mem_loc)) )
120             /* if compare-swap is successful then return what was in memory
121     */
```

```
122             if( TAKEN(__sync_val_compare_and_swap(mem_loc,ret_val,new_val) ==
123   ret_val) )
124             return ret_val;
125         /* if contrast_and_swap was not successful then return not_val */
126         return not_val;
127   }
128   #endif
129
130   /* sync_int32_t */
131
132    /* readFE -- wait until full, leave empty, return value */
133
134   #ifdef RAG_CACHED_AMO
135   static __inline sync_int32_t
136   readFE_I4(sync_int32_t *mem_loc) {
137         sync_int32_t ret_val;
138         __builtin_prefetch((void *)mem_loc,1,3);
139         while(1) {
140             while( pause((void *)mem_loc) ) /* while empty spin until full
141   */
142                 if( TAKEN(empty_val_I4 != (ret_val = *mem_loc)) )
143                     break;
144             if
145   ( TAKEN(__sync_bool_compare_and_swap(mem_loc,ret_val,empty_val_I4)) )
146                 break;
147             /* if compare-swap is not successful then wait until full again
148   */
149         }
150         return ret_val;
151   }
152   #else
153   static __inline sync_int32_t
154   readFE_I4(sync_int32_t *mem_loc) {
155         sync_int32_t ret_val;
156         while( pause((void *)mem_loc) ) { /* while empty spin until full */
157             ret_val =
158   __sync_val_contrast_and_swap_I4(mem_loc,empty_val_I4,empty_val_I4);
159             if ( TAKEN( empty_val_I4 != ret_val) )
160                 break;
161             /* if contrast-swap is not successful then wait until full
162   again */
163         }
164         return ret_val;
165   }
166   #endif
167
168    /* readFF -- wait until full, leave full, return value */
169
170   static __inline sync_int32_t
171   readFF_I4(sync_int32_t *mem_loc) {
172         sync_int32_t ret_val;
173   #ifdef RAG_CACHED_AMO
174         __builtin_prefetch((void *)mem_loc,1,3);
175   #endif
176         while( pause((void *)mem_loc) ) /* while empty spin until full */
177             if ( TAKEN(empty_val_I4 != (ret_val = *mem_loc)) )
178                 break;
179         return ret_val;
180   }
181
182   /* readXX -- non-blocking, return value */
```

```
static __inline sync_int32_t
readXX_I4(sync_int32_t *mem_loc)
{ return *mem_loc; }

/* writeEF -- wait until empty, leave full, set value */ static __inline void
writeEF_I4(sync_int32_t *mem_loc, sync_int32_t mem_val) {
      assert(empty_val_I4 != mem_val);
#ifdef RAG_CACHED_AMO
      __builtin_prefetch((void *)mem_loc,1,3);
#endif
      while( pause((void *)mem_loc) ) /* while full spin until empty */ if( TAKEN(__sync_bool_compare_and_swap(mem_loc,empty_val_I4,mem_val))
 )
            break;
            /* if compare-swap is not successful then wait until empty
again */
      return;
}

/* writeFF -- wait until full, leave full, set value */ ifdef RAG_CACHED_AMO
static __inline void
writeFF_I4(sync_int32_t *mem_loc, sync_int32_t mem_val) {
      sync_int32_t ret_val;
      assert(empty_val_I4 != mem_val);
      __builtin_prefetch((void *)mem_loc,1,3);
      while(1) {
            while( pause((void *)mem_loc) ) /* while empty spin until full
*/
                  if ( TAKEN(empty_val_I4 != (ret_val = *mem_loc)) )
                        break;
                  if
( TAKEN(__sync_bool_compare_and_swap(mem_loc,ret_val,mem_val)) )
                        break;
                  /* if compare-swap is not successful then wait until full again
*/
      }
      return;
}
#else
static __inline void
writeFF_I4(sync_int32_t *mem_loc, sync_int32_t mem_val) {
      assert(empty_val_I4 != mem_val);
      while( pause((void *)mem_loc) ) { /* while empty spin until full */
            if
( TAKEN( __sync_bool_contrast_and_swap_I4(mem_loc,empty_val_I4,mem_val)) )
                        break;
                  /* if contrast-swap is not successful then wait until full
again */
      }
      return;
}
endif /* writeXF -- non-blocking, leave full, set value */
```

```
static __inline void
writeXF_I4(sync_int32_t *mem_loc, sync_int32_t mem_val)
{ assert(empty_val_I4 != mem_val); *mem_loc = mem_val; return; }

/* reset -- non-blocking, leave empty, reset value */ static __inline void
reset_I4(sync_int32_t *mem_loc)
{ *mem_loc = empty_val_I4; return; }

/* isFull -- non-blocking, return true if full else false */ static __inline int
isFull_I4(sync_int32_t *mem_loc)
{ return (empty_val_I4 != *mem_loc); }

/* sync_int64_t */

/* readFE -- wait until full, leave empty, return value */ ifdef RAG_CACHED_AMO
static __inline sync_int64_t
readFE_I8(sync_int64_t *mem_loc) {
        sync_int64_t ret_val;
        __builtin_prefetch((void *)mem_loc,1,3);
        while(1) {
                while( pause((void *)mem_loc) ) /* while empty spin until full
*/
                        if( TAKEN(empty_val_I8 != (ret_val = *mem_loc)) )
                                break;
                if
( TAKEN(__sync_bool_compare_and_swap(mem_loc,ret_val,empty_val_I8)) )
                        break;
                /* if compare-swap is not successful then wait until full again
*/
        }
        return ret_val;
}
#else
static __inline sync_int64_t
readFE_I8(sync_int64_t *mem_loc) {
        sync_int64_t ret_val;
        while( pause((void *)mem_loc) ) { /* while empty spin until full */
                ret_val =
__sync_val_contrast_and_swap_I8(mem_loc,empty_val_I8,empty_val_I8);
                if ( TAKEN( empty_val_I8 != ret_val) )
                        break;
                /* if contrast-swap is not successful then wait until full
again */
        }
        return ret_val;
}
endif /* readFF -- wait until full, leave full, return value */ static __inline sync_int64_t
readFF_I8(sync_int64_t *mem_loc) {
        sync_int64_t ret_val;
#ifdef RAG_CACHED_AMO
```

```
305              __builtin_prefetch((void *)mem_loc,1,3);
306     #endif
307             while( pause((void *)mem_loc) ) /* while empty spin until full */
308                     if ( TAKEN(empty_val_I8 != (ret_val = *mem_loc)) )
309                             break;
310             return ret_val;
311     }
312
313     /* readXX -- non-blocking, return value */
314
315     static __inline sync_int64_t
316     readXX_I8(sync_int64_t *mem_loc)
317     { return *mem_loc; }
318
319      /* writeEF -- wait until empty, leave full, set value */
320
321     static __inline void
322     writeEF_I8(sync_int64_t *mem_loc, sync_int64_t mem_val) {
323             assert(empty_val_I8 != mem_val);
324     #ifdef RAG_CACHED_AMO
325             __builtin_prefetch((void *)mem_loc,1,3);
326     #endif
327             while( pause((void *)mem_loc) ) /* while full spin until empty */
328
329             if( TAKEN(__sync_bool_compare_and_swap(mem_loc,empty_val_I8,mem_val))
330     )
331                             break;
332                     /* if compare-swap is not successful then wait until empty
333     again */
334             return;
335     }
336
337     /* writeFF -- wait until full, leave full, set value */
338
339     #ifdef RAG_CACHED_AMO
340     static __inline void
341     writeFF_I8(sync_int64_t *mem_loc, sync_int64_t mem_val) {
342             sync_int64_t ret_val;
343             assert(empty_val_I8 != mem_val);
344             __builtin_prefetch((void *)mem_loc,1,3);
345             while(1) {
346                     while( pause((void *)mem_loc) ) /* while empty spin until full
347     */
348                             if ( TAKEN(empty_val_I8 != (ret_val = *mem_loc)) )
349                                     break;
350                     if
351     ( TAKEN(__sync_bool_compare_and_swap(mem_loc,ret_val,mem_val)) )
352                             break;
353                     /* if compare-swap is not successful then wait until full again
354     */
355             }
356             return;
357     }
358     #else
359     static __inline void
360     writeFF_I8(sync_int64_t *mem_loc, sync_int64_t mem_val) {
361             assert(empty_val_I8 != mem_val);
362             while( pause((void *)mem_loc) ) { /* while empty spin until full */
363                     if
364     ( TAKEN( __sync_bool_contrast_and_swap_I8(mem_loc,empty_val_I8,mem_val)) )
365                             break;
```

```
                /* if contrast-swap is not successful then wait until full
again */
        }
        return;
}
endif /* writeXF -- non-blocking, leave full, set value */ static __inline void
writeXF_I8(sync_int64_t *mem_loc, sync_int64_t mem_val)
{ assert(empty_val_I8 != mem_val); *mem_loc = mem_val; return; }

/* reset -- non-blocking, leave empty, reset value */ static __inline void
reset_I8(sync_int64_t *mem_loc)
{ *mem_loc = empty_val_I8; return; }

/* isFull -- non-blocking, return true if full else false */ static __inline int
isFull_I8(sync_int64_t *mem_loc)
{ return (empty_val_I8 != *mem_loc); }

/* sync_uint31_t */

/* readFE -- wait until full, leave empty, return value */ ifdef RAG_CACHED_AMO
static __inline sync_uint31_t
readFE_U4(sync_uint31_t *mem_loc) {
        sync_uint31_t ret_val;
        __builtin_prefetch((void *)mem_loc,1,3);
        while(1) {
                while( pause((void *)mem_loc) ) /* while empty spin until full
*/
                        if( TAKEN(empty_val_U4 != (ret_val = *mem_loc)) )
                                break;
                if
( TAKEN(__sync_bool_compare_and_swap(mem_loc,ret_val,empty_val_U4)) )
                        break;
                /* if compare-swap is not successful then wait until full again
*/
        }
        return ret_val;
}
#else
static __inline sync_uint31_t
readFE_U4(sync_uint31_t *mem_loc) {
        sync_uint31_t ret_val;
        while( pause((void *)mem_loc) ) { /* while empty spin until full */
                ret_val =
__sync_val_contrast_and_swap_U4(mem_loc,empty_val_I4,empty_val_I4);
                if ( TAKEN( empty_val_U4 != ret_val) )
                        break;
                /* if contrast-swap is not successful then wait until full
again */
        }
        return ret_val;
}
```

```
427  #endif
428
429   /* readFF -- wait until full, leave full, return value */
430
431  static __inline sync_uint31_t
432  readFF_U4(sync_uint31_t *mem_loc) {
433        sync_uint31_t ret_val;
434  #ifdef RAG_CACHED_AMO
435        __builtin_prefetch((void *)mem_loc,0,3);
436  #endif
437        while( pause((void *)mem_loc) ) /* while empty spin until full */
438              if ( TAKEN(empty_val_U4 != (ret_val = *mem_loc)) )
439                    break;
440        return ret_val;
441  }
442
443  /* readXX -- non-blocking, return value */
444
445  static __inline sync_uint31_t
446  readXX_U4(sync_uint31_t *mem_loc)
447  { return *mem_loc; }
448
449   /* writeEF -- wait until empty, leave full, set value */
450
451  static __inline void
452  writeEF_U4(sync_uint31_t *mem_loc, sync_uint31_t mem_val) {
453        assert(0 <= mem_val);
454  #ifdef RAG_CACHED_AMO
455        __builtin_prefetch((void *)mem_loc,1,3);
456  #endif
457        while( pause((void *)mem_loc) ) /* while full spin until empty */
458
459        if( TAKEN(__sync_bool_compare_and_swap(mem_loc,empty_val_U4,mem_val))
460  )
461              break;
462        /* if compare-swap is not successful then wait until empty
463  again */
464        return;
465  }
466
467  /* writeFF -- wait until full, leave full, set value */
468
469  #ifdef RAG_CACHED_AMO
470  static __inline void
471  writeFF_U4(sync_uint31_t *mem_loc, sync_uint31_t mem_val) {
472        sync_uint31_t ret_val;
473        assert(0 <= mem_val);
474        __builtin_prefetch((void *)mem_loc,1,3);
475        while(1) {
476              while( pause((void *)mem_loc) ) /* while empty spin until full
477  */
478                    if ( TAKEN(empty_val_U4 != (ret_val = *mem_loc)) )
479                          break;
480              if
481  ( TAKEN(__sync_bool_compare_and_swap(mem_loc,ret_val,mem_val)) )
482                    break;
483              /* if compare-swap is not successful then wait until full again
484  */
485        }
486        return;
487  }
```

```
488  #else
489  static __inline void
490  writeFF_U4(sync_uint31_t *mem_loc, sync_uint31_t mem_val) {
491         assert(0 <= mem_val);
492         while( pause((void *)mem_loc) ) { /* while empty spin until full */
493                 if
494  ( TAKEN( __sync_bool_contrast_and_swap_U4(mem_loc,empty_val_I4,mem_val)) )
495                         break;
496                 /* if contrast-swap is not successful then wait until full
497  again */
498         }
499         return;
500  }
501  #endif
502
503  /* writeXF -- non-blocking, leave full, set value */
504
505  static __inline void
506  writeXF_U4(sync_uint31_t *mem_loc, sync_uint31_t mem_val)
507  { assert(0 <= mem_val); *mem_loc = mem_val; return; }
508
509  /* reset -- non-blocking, leave empty, reset value */
510
511  static __inline void
512  reset_U4(sync_uint31_t *mem_loc)
513  { *mem_loc = empty_val_U4; return; }
514
515  /* isFull -- non-blocking, return true if full else false */
516
517  static __inline int
518  isFull_U4(sync_uint31_t *mem_loc)
519  { return (empty_val_U4 != *mem_loc); }
520
521
522  /* sync_uint63_t */
523
524   /* readFE -- wait until full, leave empty, return value */
525
526  #ifdef RAG_CACHED_AMO
527  static __inline sync_uint63_t
528  readFE_U8(sync_uint63_t *mem_loc) {
529         sync_uint63_t ret_val;
530         __builtin_prefetch((void *)mem_loc,1,3);
531         while(1) {
532                 while( pause((void *)mem_loc) ) /* while empty spin until full
533  */
534                         if( TAKEN(empty_val_U8 != (ret_val = *mem_loc)) )
535                                 break;
536                 if
537  ( TAKEN(__sync_bool_compare_and_swap(mem_loc,ret_val,empty_val_U8)) )
538                         break;
539                 /* if compare-swap is not successful then wait until full again
540  */
541         }
542         return ret_val;
543  }
544  #else
545  static __inline sync_uint63_t
546  readFE_U8(sync_uint63_t *mem_loc) {
547         sync_uint63_t ret_val;
548         while( pause((void *)mem_loc) ) { /* while empty spin until full */
```

```
549                 ret_val =
550     __sync_val_contrast_and_swap_U8(mem_loc,empty_val_I8,empty_val_I8);
551             if ( TAKEN( empty_val_U8 != ret_val) )
552                 break;
553             /* if contrast-swap is not successful then wait until full
554     again */
555         }
556         return ret_val;
557     }
558     #endif
559
560     /* readFF -- wait until full, leave full, return value */
561
562     static __inline sync_uint63_t
563     readFF_U8(sync_uint63_t *mem_loc) {
564         sync_uint63_t ret_val;
565     #ifdef RAG_CACHED_AMO
566         __builtin_prefetch((void *)mem_loc,0,3);
567     #endif
568         while( pause((void *)mem_loc) ) /* while empty spin until full */
569             if ( TAKEN(empty_val_U8 != (ret_val = *mem_loc)) )
570                 break;
571         return ret_val;
572     }
573
574     /* readXX -- non-blocking, return value */
575
576     static __inline sync_uint63_t
577     readXX_U8(sync_uint63_t *mem_loc)
578     { return *mem_loc; }
579
580     /* writeEF -- wait until empty, leave full, set value */
581
582     static __inline void
583     writeEF_U8(sync_uint63_t *mem_loc, sync_uint63_t mem_val) {
584         assert(0 <= mem_val);
585     #ifdef RAG_CACHED_AMO
586         __builtin_prefetch((void *)mem_loc,1,3);
587     #endif
588         while( pause((void *)mem_loc) ) /* while full spin until empty */
589
590             if( TAKEN(__sync_bool_compare_and_swap(mem_loc,empty_val_U8,mem_val))
591     )
592                 break;
593             /* if compare-swap is not successful then wait until empty
594     again */
595         return;
596     }
597
598     /* writeFF -- wait until full, leave full, set value */
599
600     #ifdef RAG_CACHED_AMO
601     static __inline void
602     writeFF_U8(sync_uint63_t *mem_loc, sync_uint63_t mem_val) {
603         sync_uint63_t ret_val;
604         assert(0 <= mem_val);
605         __builtin_prefetch((void *)mem_loc,1,3);
606         while(1) {
607             while( pause((void *)mem_loc) ) /* while empty spin until full
608     */
609                 if ( TAKEN(empty_val_U8 != (ret_val = *mem_loc)) )
```

```
                break;
        if
( TAKEN(__sync_bool_compare_and_swap(mem_loc,ret_val,mem_val)) )
                break;
            /* if compare-swap is not successful then wait until full again
*/
    }
    return;
}
#else
static __inline void
writeFF_U8(sync_uint63_t *mem_loc, sync_uint63_t mem_val) {
    assert(0 <= mem_val);
    while( pause((void *)mem_loc) ) { /* while empty spin until full */
            if
( TAKEN( __sync_bool_contrast_and_swap_U8(mem_loc,empty_val_I8,mem_val)) )
                break;
            /* if contrast-swap is not successful then wait until full
again */
    }
    return;
}
endif /* writeXF -- non-blocking, leave full, set value */ static __inline void
writeXF_U8(sync_uint63_t *mem_loc, sync_uint63_t mem_val)
{ assert(0 <= mem_val); *mem_loc = mem_val; return; }

/* reset -- non-blocking, leave empty, reset value */ static __inline void
reset_U8(sync_uint63_t *mem_loc)
{ *mem_loc = empty_val_U8; return; }

/* isFull -- non-blocking, return true if full else false */ static __inline int
isFull_U8(sync_uint63_t *mem_loc)
{ return (empty_val_U8 != *mem_loc); }

/* sync_float32_t */

/* readFE -- wait until full, leave empty, return value */ ifdef RAG_CACHED_AMO
static __inline sync_float32_t
readFE_F4(sync_float32_t *mem_loc) {
    union reinterpret_cast_int_and_float { sync_int32_t i; sync_float32_t
f; } ret_val;
        __builtin_prefetch((void *)mem_loc,1,3);
    while(1) {
            while( pause((void *)mem_loc) ) { /* while empty spin until
full */
                    ret_val.f = *mem_loc;
                    if( TAKEN(empty_val_F4 != ret_val.i) )
                            break;
            }
            if ( TAKEN(__sync_bool_compare_and_swap((sync_int32_t
*)mem_loc,ret_val.i,empty_val_F4)) )
```

```
                break;
        /* if compare-swap is not successful then wait until full again
*/
        }
        return ret_val.f;
}
#else
static __inline sync_float32_t
readFE_F4(sync_float32_t *mem_loc) {
        union reinterpret_cast_int_and_float { sync_int32_t i; sync_float32_t
f; } ret_val;
        while( pause((void *)mem_loc) ) { /* while empty spin until full */
                ret_val.i = __sync_val_contrast_and_swap_I4((sync_int32_t
*)mem_loc,empty_val_F4,empty_val_F4);
                if ( TAKEN( empty_val_F4 != ret_val.i) )
                        break;
                /* if contrast-swap is not successful then wait until full
again */
        }
        return ret_val.f;
}
endif /* readFF -- wait until full, leave full, return value */ static __inline sync_float32_t
readFF_F4(sync_float32_t *mem_loc) {
        union reinterpret_cast_int_and_float { sync_int32_t i; sync_float32_t
f; } ret_val;
#ifdef RAG_CACHED_AMO
        __builtin_prefetch((void *)mem_loc,0,3);
#endif
        while( pause((void *)mem_loc) ) { /* while empty spin until full */
                ret_val.f = *mem_loc;
                if ( TAKEN(empty_val_F4 != ret_val.i) )
                        break;
        }
        return ret_val.f;
}

/* readXX -- non-blocking, return value */ static __inline sync_float32_t
readXX_F4(sync_float32_t *mem_loc)
{ return *mem_loc; }

/* writeEF -- wait until empty, leave full, set value */ static __inline void
writeEF_F4(sync_float32_t *mem_loc, sync_float32_t mem_val) {
        union reinterpret_cast_int_and_float { sync_int32_t i; sync_float32_t
f; } unsafe_type_mixing;
        unsafe_type_mixing.f = mem_val;
        assert(empty_val_F4 != unsafe_type_mixing.i);
#ifdef RAG_CACHED_AMO
        __builtin_prefetch((void *)mem_loc,1,3);
#endif
        while( pause((void *)mem_loc) ) /* while full spin until empty */
                if( TAKEN(__sync_bool_compare_and_swap((sync_int32_t
*)mem_loc,empty_val_F4,unsafe_type_mixing.i)) )
```

```
                break;
            /* if compare-swap is not successful then wait until empty
again */
        return;
}

/* writeFF -- wait until full, leave full, set value */ ifdef RAG_CACHED_AMO
static __inline void
writeFF_F4(sync_float32_t *mem_loc, sync_float32_t mem_val) {
        union reinterpret_cast_int_and_float { sync_int32_t i; sync_float32_t
f; } unsafe_type_mixing, ret_val;
        unsafe_type_mixing.f = mem_val;
        assert(empty_val_F4 != unsafe_type_mixing.i);
        __builtin_prefetch((void *)mem_loc,1,3);
        while(1) {
                while( pause((void *)mem_loc) ) {/* while empty spin until full
*/
                        ret_val.f = *mem_loc;
                        if ( TAKEN(empty_val_F4 != ret_val.i) )
                                break;
                }
                if ( TAKEN(__sync_bool_compare_and_swap((sync_int32_t
*)mem_loc,ret_val.i,unsafe_type_mixing.i)) )
                        break;
                /* if compare-swap is not successful then wait until full again
*/
        }
        return;
}
#else
static __inline void
writeFF_F4(sync_float32_t *mem_loc, sync_float32_t mem_val) {
        union reinterpret_cast_int_and_float { sync_int32_t i; sync_float32_t
f; } unsafe_type_mixing;
        unsafe_type_mixing.f = mem_val;
        assert(empty_val_F4 != unsafe_type_mixing.i);
        while( pause((void *)mem_loc) ) { /* while empty spin until full */
                if ( TAKEN( __sync_bool_contrast_and_swap_I4((sync_int32_t
*)mem_loc,empty_val_F4,unsafe_type_mixing.i)) )
                        break;
                /* if contrast-swap is not successful then wait until full
again */
        }
        return;
}
endif /* writeXF -- non-blocking, leave full, set value */ static __inline void writeXF_F4(sync_float32_t *mem_loc, sync_float32_t
mem_val) {
        union reinterpret_cast_int_and_float { sync_int32_t i; sync_float32_t
f; } unsafe_type_mixing;
        unsafe_type_mixing.f = mem_val;
        assert(empty_val_F4 != unsafe_type_mixing.i);
        /* a don't care write and set full */
        *mem_loc = unsafe_type_mixing.f;
        return;
}
```

```
/* reset -- non-blocking, leave empty, reset value */ static __inline void
reset_F4(sync_float32_t *mem_loc) {
        union reinterpret_cast_int_and_float { sync_int32_t i; sync_float32_t
f; } unsafe_type_mixing;
        unsafe_type_mixing.i = empty_val_F4;
          *mem_loc = unsafe_type_mixing.f;
        return;
}

/* isFull -- non-blocking, return true if full else false */ static __inline int isFull_F4(sync_float32_t *mem_loc) {
        union reinterpret_cast_int_and_float { sync_int32_t i; sync_float32_t
f; } unsafe_type_mixing;
        unsafe_type_mixing.f = *mem_loc;
        return (empty_val_F4 != unsafe_type_mixing.i);
}

/* sync_float64_t */

/* readFE -- wait until full, leave empty, return value */ ifdef RAG_CACHED_AMO
static __inline sync_float64_t
readFE_F8(sync_float64_t *mem_loc) {
        union reinterpret_cast_int_and_float { sync_int64_t i; sync_float64_t
f; } ret_val;
        __builtin_prefetch((void *)mem_loc,1,3);
        while(1) {
                while( pause((void *)mem_loc) ) { /* while empty spin until
full */
                        ret_val.f = *mem_loc;
                        if( TAKEN(empty_val_F8 != ret_val.i) )
                                break;
                }
                if ( TAKEN(__sync_bool_compare_and_swap((sync_int64_t
*)mem_loc,ret_val.i,empty_val_F8)) )
                        break;
                /* if compare-swap is not successful then wait until full again
*/
        }
        return ret_val.f;
}
#else
static __inline sync_float64_t
readFE_F8(sync_float64_t *mem_loc) {
        union reinterpret_cast_int_and_float { sync_int64_t i; sync_float64_t
f; } ret_val;
        while( pause((void *)mem_loc) ) { /* while empty spin until full */
                ret_val.i = __sync_val_contrast_and_swap_I8((sync_int64_t
*)mem_loc,empty_val_F8,empty_val_F8);
                if ( TAKEN( empty_val_F8 != ret_val.i) )
                        break;
                /* if contrast-swap is not successful then wait until full
again */
        }
        return ret_val.f;
}
```

```
#endif

/* readFF -- wait until full, leave full, return value */ static __inline sync_float64_t
readFF_F8(sync_float64_t *mem_loc) {
    union reinterpret_cast_int_and_float { sync_int64_t i; sync_float64_t
f; } ret_val;
#ifdef RAG_CACHED_AMO
    __builtin_prefetch((void *)mem_loc,0,3);
#endif
    while( pause((void *)mem_loc) ) { /* while empty spin until full */
        ret_val.f = *mem_loc;
        if ( TAKEN(empty_val_F8 != ret_val.i) )
            break;
    }
    return ret_val.f;
}

/* readXX -- non-blocking, return value */ static __inline sync_float64_t
readXX_F8(sync_float64_t *mem_loc)
{ return *mem_loc; }

/* writeEF -- wait until empty, leave full, set value */ static __inline void
writeEF_F8(sync_float64_t *mem_loc, sync_float64_t mem_val) {
    union reinterpret_cast_int_and_float { sync_int64_t i; sync_float64_t
f; } unsafe_type_mixing;
    unsafe_type_mixing.f = mem_val;
    assert(empty_val_F8 != unsafe_type_mixing.i);
#ifdef RAG_CACHED_AMO
    __builtin_prefetch((void *)mem_loc,1,3);
#endif
    while( pause((void *)mem_loc) ) /* while full spin until empty */
        if( TAKEN(__sync_bool_compare_and_swap((sync_int64_t
*)mem_loc,empty_val_F8,unsafe_type_mixing.i)) )
            break;
        /* if compare-swap is not successful then wait until empty
again */
    return;
}

/* writeFF -- wait until full, leave full, set value */ ifdef RAG_CACHED_AMO
static __inline void
writeFF_F8(sync_float64_t *mem_loc, sync_float64_t mem_val) {
    union reinterpret_cast_int_and_float { sync_int64_t i; sync_float64_t
f; } unsafe_type_mixing, ret_val;
    unsafe_type_mixing.f = mem_val;
    assert(empty_val_F8 != unsafe_type_mixing.i);
    __builtin_prefetch((void *)mem_loc,1,3);
    while(1) {
        while( pause((void *)mem_loc) ) {/* while empty spin until full
*/
            ret_val.f = *mem_loc;
            if ( TAKEN(empty_val_F8 != ret_val.i) )
```

```
                break;
        }
            if ( TAKEN(__sync_bool_compare_and_swap((sync_int64_t
*)mem_loc,ret_val.i,unsafe_type_mixing.i)) )
                break;
            /* if compare-swap is not successful then wait until full again
*/
    }
        return;
}
#else
static __inline void
writeFF_F8(sync_float64_t *mem_loc, sync_float64_t mem_val) {
        union reinterpret_cast_int_and_float { sync_int64_t i; sync_float64_t
f; } unsafe_type_mixing;
        unsafe_type_mixing.f = mem_val;
        assert(empty_val_F8 != unsafe_type_mixing.i);
        while( pause((void *)mem_loc) ) { /* while empty spin until full */
            if ( TAKEN( __sync_bool_contrast_and_swap_I8((sync_int64_t
*)mem_loc,empty_val_F8,unsafe_type_mixing.i)) )
                    break;
                /* if contrast-swap is not successful then wait until full
again */
        }
        return;
}
endif /* writeXF -- non-blocking, leave full, set value */ static __inline void writeXF_F8(sync_float64_t *mem_loc, sync_float64_t
mem_val) {
        union reinterpret_cast_int_and_float { sync_int64_t i; sync_float64_t
f; } unsafe_type_mixing;
        unsafe_type_mixing.f = mem_val;
        assert(empty_val_F8 != unsafe_type_mixing.i);
        /* a don't care write and set full */
        *mem_loc = unsafe_type_mixing.f;
        return;
}

/* reset -- non-blocking, leave empty, reset value */ static __inline void
reset_F8(sync_float64_t *mem_loc) {
        union reinterpret_cast_int_and_float { sync_int64_t i; sync_float64_t
f; } unsafe_type_mixing;
        unsafe_type_mixing.i = empty_val_F8;
          *mem_loc = unsafe_type_mixing.f;
        return;
}

/* isFull -- non-blocking, return true if full else false */ static __inline int isFull_F8(sync_float64_t *mem_loc) {
        union reinterpret_cast_int_and_float { sync_int64_t i; sync_float64_t
f; } unsafe_type_mixing;
        unsafe_type_mixing.f = *mem_loc;
        return (empty_val_F8 != unsafe_type_mixing.i);
}
```

```
976    #endif // EMS_ON_X86_64_H
```

What is claimed is:

1. A computer-implemented method, comprising:
obtaining a set of computer instructions that include an Extended Memory Semantics (EMS) operation;
converting the EMS operation into a corresponding software function including an atomic memory operation (AMO); and
executing the function on at least one processor of a computer, wherein execution of the function causes the AMO to perform a memory access requested by the EMS operation, wherein the AMO is one of a Compare-and-Swap operation, a Contrast-and-Swap operation and a Test-and-Set operation, wherein the AMO performs the requested memory access while the function locks a corresponding memory resource based on a software parameter that emulates an EMS full or empty bit after being set to a designated value, and wherein the designated value represents an empty memory state.

2. The method of claim 1, wherein the AMO is a Compare-and-Swap operation.

3. The method of claim 1, wherein the EMS operation is a writeEF operation.

4. The method of claim 1, wherein the AMO is a Contrast-and-Swap operation.

5. The method of claim 4, wherein the EMS operation is a writeFF operation.

6. The method of claim 4, further comprising providing both a cached version and a non-cached version of the function, both versions being selectable for use in converting the EMS operation.

7. The method of claim 6, wherein only the non-cached version includes the Contrast-and-Swap operation.

8. The method of claim 1, wherein the EMS operation is a readFE operation.

9. The method of claim 1, wherein the computer instructions are part of a software program that includes a plurality of threads, the method further comprising executing the plurality of threads using parallel processing.

10. The method of claim 1, wherein the designated value is an unused value that varies depending on data type, and wherein the designated value is specified for at least one of the following data types: floating point, pointer, signed integer and unsigned integer.

11. A computer system, comprising:
a computer processor; and
a storage memory accessed by the computer processor, wherein the computer processor is configured to perform the following:
obtaining a set of computer instructions that include an Extended Memory Semantics (EMS) operation;
converting the EMS operation into a corresponding software function including an atomic memory operation (AMO); and
executing the function, wherein execution of the function causes the AMO to perform a memory access requested by the EMS operation, wherein the AMO is one of a Compare-and-Swap operation, a Contrast-and-Swap operation and a Test-and-Set operation, wherein the AMO performs the requested memory access while the function locks a corresponding memory resource based on a software parameter that emulates an EMS full or empty bit after being set to a designated value, and wherein the designated value represents an empty memory state.

12. The computer system of claim 11, wherein the AMO is a Compare-and-Swap operation.

13. The computer system of claim 11, wherein the EMS operation is a writeEF operation.

14. The computer system of claim 11, wherein the AMO is a Contrast-and-Swap operation.

15. The computer system of claim 14, wherein the EMS operation is a writeFF operation.

16. The computer system of claim 14, wherein the system includes a cached version and a non-cached version of the function, both versions being selectable for use in converting the EMS operation.

17. The computer system of claim 16, wherein only the non-cached version includes the Contrast-and-Swap operation.

18. The computer system of claim 11, wherein the EMS operation is a readFE operation.

19. The computer system of claim 11, wherein the computer instructions are part of a software program that includes a plurality of threads and the system is configured to execute the plurality of threads using parallel processing.

20. The computer system of claim 11, wherein the designated value is an unused value that varies depending on data type, and wherein the designated value is specified for at least one of the following data types: floating point, pointer, signed integer and unsigned integer.

21. A non-transitory hardware-implemented computer-readable storage medium having stored thereon a series of instructions executable by a processor of a computer, the instructions which, when executed, cause the processor to perform a method, the method comprising:
obtaining a set of computer instructions that include an Extended Memory Semantics (EMS) operation;
converting the EMS operation into a corresponding software function including an atomic memory operation (AMO); and
executing the function on at least one processor of the computer, wherein execution of the function causes the AMO to perform a memory access requested by the EMS operation, wherein the AMO is one of a Compare-and-Swap operation, a Contrast-and-Swap operation and a Test-and-Set operation, wherein the AMO performs the requested memory access while the function locks a corresponding memory resource based on a software parameter that emulates an EMS full or empty bit after being set to a designated value, and wherein the designated value represents an empty memory state.

22. The computer-readable storage medium of claim 21, wherein the AMO is a Compare-and-Swap operation.

23. The computer-readable storage medium of claim 21, wherein the AMO is a Contrast-and-Swap operation.

24. The computer-readable storage medium of claim 21, wherein the designated value is an unused value that varies depending on data type, and wherein the designated value is specified for at least one of the following data types: floating point, pointer, signed integer and unsigned integer.

* * * * *